United States Patent Office 3,264,855
Patented August 9, 1966

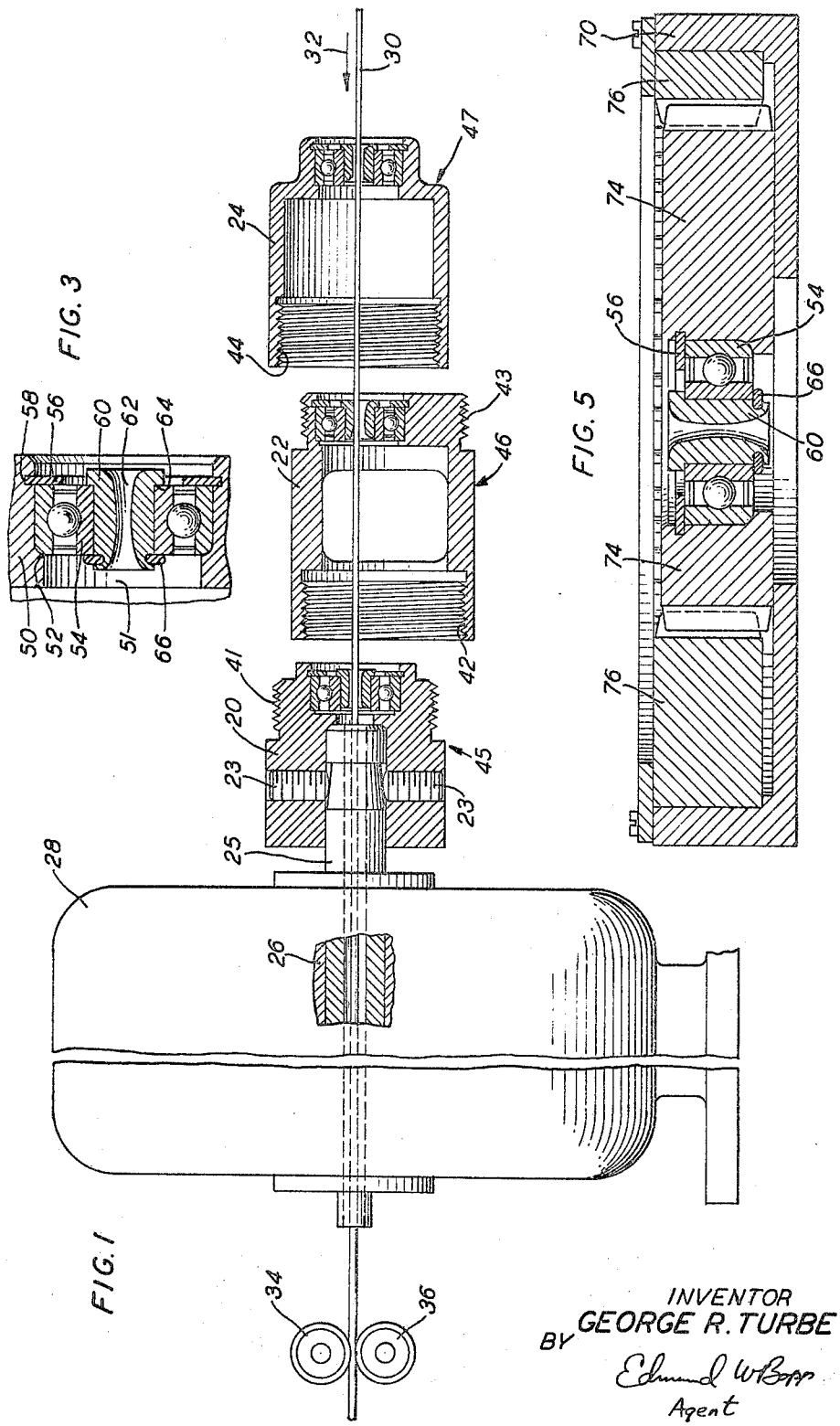

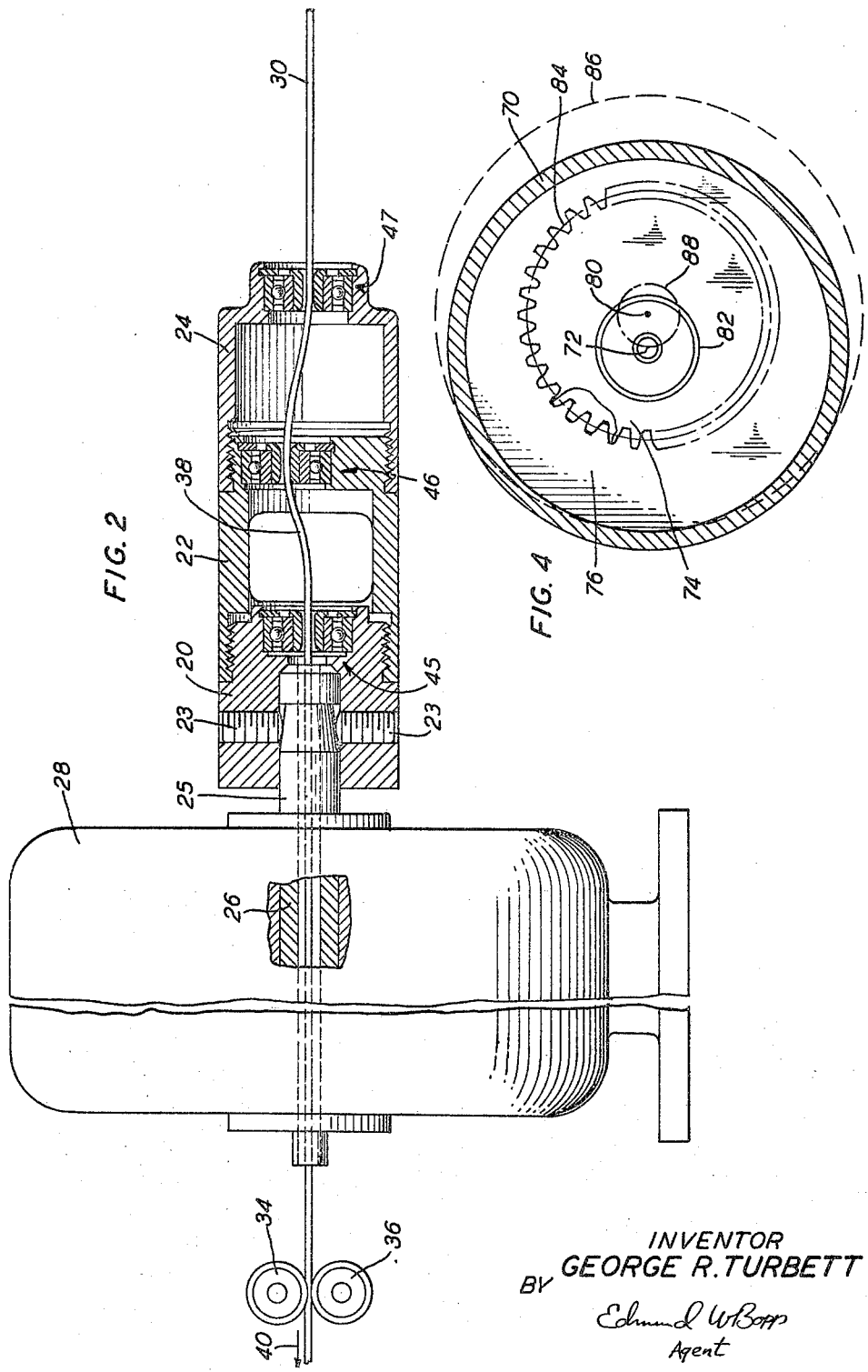

---

3,264,855
DEMOUNTABLE HOLLOW ARMATURE WIRE STRAIGHTENER
George R. Turbett, Chatham Township, N.J., assignor to Air Reduction Company, Incorporated, New York, N.Y., a corporation of New York
Filed Sept. 17, 1963, Ser. No. 309,521
5 Claims. (Cl. 72—79)

My invention relates to wire straighteners of the motor driven hollow armature type and more particularly to an easily demountable wire straightener that is adjustable to accommodate wires of differing diameter and stiffness.

An object of the invention is to decrease the necessary unbalance of weight, both static and dynamic, in the eccentric element of the device.

Another object is to facilitate the initial threading of the wire through the device, particularly in the case of relatively stiff wire to be straightened.

A further object is to facilitate the adjustment of the device to accommodate wires of differing diameter and stiffness.

An additional object is to reduce hazards from exposed rotating parts.

A feature of the invention is the division of the device into a plurality of parts which are readily connected and disconnected as by threaded engagements. Two of these parts have central apertures and central bushings through which the wire to be straightened is passed. As these parts require no eccentricity they may be circularly symmetrical and have substantially perfect static and dynamic balance in rotary motion. A third part is introduced between the above mentioned two parts and all three may be of equal outside diameter and substantially coaxial in general configuration. This intermediate part provides the necessary eccentricity to furnish the required flexing and straightening action. However, the aperture and bushing may be of relatively small diameter compared to the outside diameter of the part, so that dynamic unbalance may be held to a minimum. The static balance of the eccentric part may be made substantially perfect.

A related feature due to the three part construction is the ease of threading the wire through the eccentric aperture and the two central apertures. With the three parts disconnected, there is no difficulty in threading the wire through one part at a time, however stiff the wire may be. The parts may then be connected together without difficulty, there being plenty of leverage available to bend the threaded wire into sufficient alignment to bring the parts together.

Another feature is the use of detachable bushings of wear resistant material, which bushings may be provided in a variety of hole diameters to accommodate different sizes of wire to be straightened and may readily be substituted one for another as required.

A further feature is a two-part bushing holder easily adjustable as to the degree of eccentricity afforded. The two parts comprise internally and externally toothed gear members eccentrically mounted with respect to the central axis of the bushing holder, the externally toothed gear member containing a bushing with an aperture that is eccentric with respect to the central axis of the externally toothed gear member. By rotating one gear member with respect to the other, the eccentricity of the aperture may be varied continuously over a range, for example from zero to a maximum value.

An outstanding general feature of the devices described and shown herein is that the eccentric parts are enclosed entirely within coaxial circularly cylindrical housings which present a safe exterior during rotation and which protect persons in the vicinity from possible injury by whipping wire or projecting rotating parts.

Other objects, features and advantages will appear from the following more detailed description of illustrative embodiments of the invention, which will now be given in conjunction with the accompanying drawings.

In the drawings,

FIG. 1 is a disassembled view principally in cross section, showing parts of a wire straightener in the position convenient for initial threading of the wire through the various parts of the device;

FIG. 2 is an assembled view principally in cross section, showing the parts connected together after initial threading of the wire;

FIG. 3 is a cross-sectional view of a preferred form of bushing for use in the wire straightener of FIGS. 1 and 2, in a form suitable for either central or eccentric mounting;

FIG. 4 is a plan view, partly diagrammatical, of a bushing mount providing an easily adjustable degree of eccentricity; and FIG. 5 is a cross-sectional view on a larger scale, of the bushing mount of FIG. 4.

Referring to FIG. 1, three separable parts 20, 22 and 24 of my wire straightening assembly are shown disconnected from each other and with the part 20 secured by means of a set screw 23 to an extended portion 25 of a hollow shaft 26 of a motor 28. A wire 30 to be straightened, even though quite stiff, is readily threaded in the direction of the arrow 32, in turn through the member 24, the member 22 in which the passage for the wire is eccentric, the member 20, and the hollow shaft 26 to a pair of wire drive rolls 34, 36.

The parts 20, 22, 24 are preferably provided with meshing threaded engagements, for example, the part 20 having an externally threaded portion 41, the part 22 as viewed in the figure having an internally threaded left-hand portion 42 and an externally threaded righthand portion 43, and the part 24 having an internally threaded portion 44.

After the initial threading of the wire to be straightened, the member 22 may be secured to the member 20 and the member 24 to the member 22 as shown in FIG. 2 with the result that the wire 30 is deflected through the eccentric passage in the member 22 in passing from the central passage in member 24 to the central passage in member 20. In coupling the part 22 to the part 20, it is necessary to bend the wire 30 by hand only sufficiently to engage the threaded portions 41 and 42 over a part of a turn. Thereafter, the part 22 may be given several complete turns, during which the wire 30 will be readily forced to comply without manual manipulation. Similarly, the engagement of the parts 22 and 24 is readily effected even with a very stiff wire. To advance the wire 30 through the wire straightener, one or both of the rolls 34 and 36 may be driven in known manner by a motor (not shown) and at the same time, the motor 28 may be driven so as to continuously flex the wire 30 as it is drawn through the eccentric member 22, the wire 30 being drawn in the direction indicated by the arrow 40. It is found that the flexing of the wire in the region between the central passages causes the wire to emerge from the member 20 substantially straightened, being substantially free of any curvature which it may have as it enters the member 24. In addition to being straightened, the wire receives a shearing stress administered locally as it is rotated by the member 22, which stress will tend to twist the wire, or if the wire at one or both ends is free to rotate about its central axis it will do so and such rotation will be observable under suitable circumstances. Such twisting or rotation ordinarily has no deleterious effect.

The wire 30 to be straightened may be drawn from any supply source, for example from a storage reel from which it may emerge with a set curvature due to being confined on the reel. The straightened wire emerging from the rolls 34, 36 may be used for any desired purpose, for example as a consumable arc electrode to be fed through a guide tube to an electric arc.

The wire straightening passages or bushings are designated 45, 46, 47, and may be similarly constructed whether the passage is to be central or eccentric. An illustrative bushing structure is shown in FIG. 3. A body portion 50 has a generally cylindrical bore 51 therein provided with an inner shoulder 52 which retains one end of a conventional cylindrical ball bearing assembly 54. To retain the other end of the ball bearing assembly 54, a spring retaining ring 56 is inserted into an annular slot 58 in the inner wall of the bore 51. A case-hardened bushing 60 is secured to the inner race of the ball bearing assembly 54 by a snug frictional fit. The edges of the openings at both ends of the bushing 60 are smoothly rounded to avoid injury to the wire entering or leaving the bushing. Interchangeable bushings having different inside diameters and the same outside diameter as the bushing 60 may be substituted therefor to accommodate wires of different diameters. The bushing should have a large enough inside diameter to allow the wire to be drawn through without excessive friction, but the opening should be small enough to prevent whipping of the wire as it passes through.

Friction between the wire and the inner surface of the bushing 60 may be reduced by smoothly tapering the internal passage as shown at 62. The retaining of the bushing 60 within the ball bearing assembly 54 may be made positive independently of frictional fit by providing a shoulder 64 at one end of the bushing and a spring retaining ring 66 in an annular groove at the other end while preserving convenient interchangeability of bushings.

It will be observed from FIG. 2 that the parts 20, 22 and 24 present a substantially circular cylindrical exterior with no exposed eccentric parts. In particular, there is generally no danger even in touching the revolving parts, the whipping wire and eccentric bushings being entirely enclosed within the cylindrical parts.

Referring to FIGS. 4 and 5, there is shown an arrangement for mechanically adjusting the degree of eccentricity of a bushing such as is used in the center position of the three bushings used in the wire straightener. A circular cylindrical supporting member is shown at 70 with the trace of its central axis indicated by a dot 72. Mounted within the member 70 is a pair of meshing gear wheels 74, 76, of which wheel 74 is a spur gear preferably of solid disk type with central hole, if any, preferably of relatively small diameter. The wheel 76 is an internal gear having preferably a solid outer rim. The outer diameter of the wheel 76 is originally somewhat greater than the inner diameter of the member 70 and is then cut eccentrically to a circular periphery to fit into the member 70, preferably in such manner that the periphery of the wheel 76 so cut is tangent to the original periphery of the wheel before cutting. The eccentricity of the cut wheel in the member 70 is then defined by the distance between the point 72 at the center of the member 70 and a point 80 which marks the original center of the wheel 76. Necessarily, the point 80 also marks the center of the spur gear 74. The bushing 82 is then mounted in the spur gear 74 with the same degree of eccentricity from the center 80 of the spur gear as the center 80 has with respect to the axis 72 of the member 80. This common measure of eccentricity is the distance between the points 72 and 80 in FIG. 4.

The common pitch circle of the gears 74 and 76 is shown at 84 and the original periphery of the gear 76 before cutting is shown in broken line at 86.

For the particular setting of the gears 74 and 76 shown in FIGS. 4 and 5, the bushing 82 is centered in the member 70, the position of zero eccentricity, the center of the bushing being at the point 72. Different discrete values of eccentricity of the bushing may be obtained by drawing the spur gear 74 out of mesh, rotating it by one or more tooth intervals and reinserting the spur gear into the internal gear 76. By this procedure, the center of the bushing may be moved away from the point 72 along a circle 88 centered at the point 80. The maximum degree of eccentricity provided is twice the distance between the points 72 and 80.

While illustrative forms of apparatus and methods in accordance with the invention have been described and shown herein, it will be understood that numerous changes may be made without departing from the general principles and scope of the invention.

I claim:
1. In a wire straightening apparatus, in combination, three hollow cylindrical members, wire passing bushing means individual to each of said members, two of which bushing means are aligned parallel and coaxial with the central axis of their respective cylindrical member and the third of which is aligned parallel to the central axis of its respective cylindrical member but displaced therefrom, each of said cylindrical members having connecting means at at least one of its ends and the member with the bushing means offset from center having connecting means at both of its ends with the connecting means at each end demountably securable to the connecting means of one of the other members, whereby the three members may be demountably connected end to end along a common axis.

2. Apparatus according to claim 1 in which each of said cylindrical members has substantially the same outer diameter whereby the three cylindrical members when connected together form a cylinder of substantially constant outside diameter.

3. Apparatus according to claim 1 wherein the connecting means on the ends of the cylindrical members are rotary connecting means such that one member is rotated with respect to another when making a connection therebetween.

4. Apparatus according to claim 1 wherein eccentric adjusting means is connected to said third bushing means whereby the amount the bushing is displaced from the member axis is variable.

5. In a wire straightening apparatus, in combination, three hollow circular cylindrical members of substantially equal outside diameter, threaded joining means individual to each of said cylindrical members for detachably joining said members end to end in a predetermined order so as to present a substantially circular cylindrical exterior, wire working bushing means individual to each said member and positioned within the respective members, the first and third of said members in said order having said bushing means aligned coaxially with the central axis of the respective member, and the intermediate member having said bushing means aligned parallel to the central axis but offset therefrom, whereby the said members can be joined in coaxial alignment and can be separated to adjust the relative positions of the members, and whereby a workpiece wire can be passed freely through said respective bushing means one by one while said members are detached from one another.

References Cited by the Examiner

UNITED STATES PATENTS

| | | | |
|---|---|---|---|
| 603,836 | 5/1898 | Algeo | 72—160 |
| 1,091,035 | 3/1914 | Bohm et al. | 74—571 |
| 2,477,587 | 8/1949 | Doutt | 74—571 |
| 2,888,974 | 6/1959 | Zeller | 140—147 |
| 3,097,543 | 7/1963 | Godsil et al. | 74—571 |

CHARLES W. LANHAM, *Primary Examiner.*

R. D. GREFE, *Assistant Examiner.*